J. E. LILLBERG.
GRAVITY LEVEL AND PLUMB.
APPLICATION FILED DEC. 31, 1918.
1,338,639.
Patented Apr. 27, 1920.
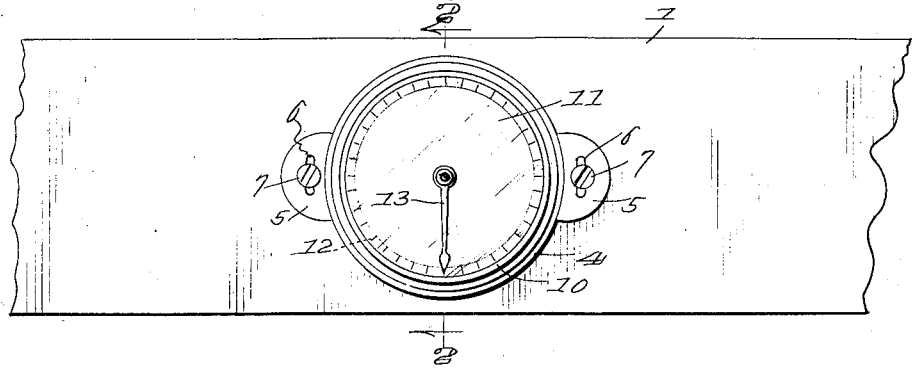
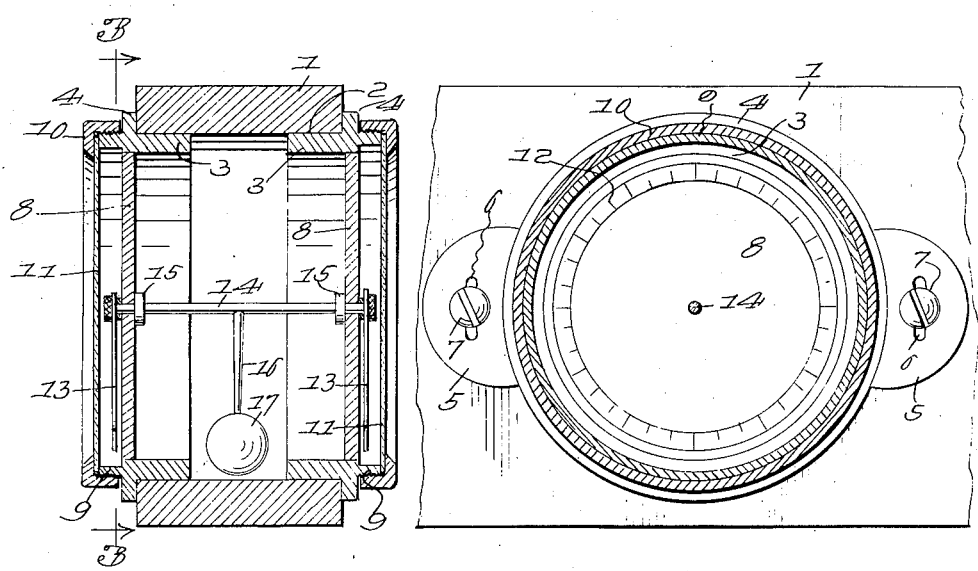
Inventor
John E. Lillberg.
Attorney

UNITED STATES PATENT OFFICE.

JOHN EMIL LILLBERG, OF DOVER, MONTANA.

GRAVITY LEVEL AND PLUMB.

1,338,639.     Specification of Letters Patent.     Patented Apr. 27, 1920.

Application filed December 31, 1918. Serial No. 269,080.

*To all whom it may concern:*

Be it known that I, JOHN EMIL LILLBERG, a citizen of the United States of America, residing at Dover, in the county of Fergus and State of Montana, have invented new and useful Improvements in Gravity Levels and Plumbs, of which the following is a specification.

The object of the invention is to provide a level or plumb by means of which the amount that a piece of work is out of plumb may be indicated in angular units. The device is so constructed that it may be used for testing both horizontal and vertical work, and being readable in angular units may be serviceable as an inclinometer. Means are provided for setting the instrument so that it may be tested and reset for accuracy in case it fails to indicate accurately as a result of a long use.

The invention further seeks to provide a device of this character which is simple in construction, durable and effective in operation, and inexpensive to manufacture.

As shown and described, a specific embodiment of the invention is adhered to, but to this embodiment the invention is not to be restricted. The right is reserved to make such changes or alterations as the actual reduction to practice may suggest, in so far as such changes or alterations are compatible in spirit with the annexed claim.

In the accompanying drawings:

Figure 1 is a view in side elevation of the improved device.

Fig. 2 is an enlarged sectional view on the line 2—2 of Fig. 1.

Fig. 3 is a section on the line 3—3 of Fig. 2.

Referring to the drawings, the invention is shown as comprising a stock 1, formed with a transversely disposed bore 2 extending from one side to the other, and positioned substantially at the longitudinal center of the stock. Thimbles 3 are inserted in this bore, and these thimbles are formed with flanges 4, the latter being formed on diametrically opposite sides with ears 5. The latter have arcuate slots 6, through which are passed the screws 7 threading into the stock. The heads of these screws bear against the outer faces of the ears 6 and thereby secure the thimbles to the stock.

The thimbles are attached to the stock and enter the bore 2 on the opposite sides of the stock and each thimble has set into it from its outer end a disk 8. The disk 8 may be formed integral with the thimble or it may be attached to the thimble after the latter is formed, but the attachment of the disk is permanent, it being soldered, brazed or otherwise suitably attached to the thimble. On the outer face of the flange 4 of each thimble there is formed an externally threaded annular flange 9 and the purpose of this flange is to receive and support the bezel 10 designed to secure the glass cover 11 in place on the thimble. The disk 8 on its outer face is calibrated in suitable angular units indicated at 12, and the disk thus constitutes a dial over which the pointers 13 play.

As a means for mounting the pointers, of which there are two, one for each dial, a shaft 14 is provided and this shaft is formed with integral collars 15 adjacent either end, the ends projecting beyond the collars passing through and being journaled in holes formed in and centrally disposed in the disks 8. These ends of the shaft 14 project far enough beyond the front faces of the disks 8 to permit the attachment to them of the pointers 13 which are attached in any acceptable manner so that they may be precluded from angular movement relative to the shaft. At the center of the shaft 14 there is connected with the shaft a right-angularly disposed arm 16, and the latter carries at its lower or free end a weight 17. The pointers are preferably directed downward so that they hang in direct vertical lines, and when the stock 1 is exactly horizontal these pointers point to the zero indications on the dials of the faces of disks 8. When the stock is placed on a piece of work, if the work be horizontal, the pointers will continue to point to the zero indication, but if the work be slightly inclined, the stock will thereby be inclined and the pointers will retain their vertical position because of the gravity actuated weight 17. The dials will thus be moved with reference to the pointers and the amount that the work is out of plumb will be indicated thereby in angular units on the dial.

The device operates in the same way in testing upright work and it is obvious from the construction just disclosed that it is serviceable also as an inclinometer to indicate degrees of a certain incline on which the stock may be placed.

In the event that the tool lose its accuracy so that the pointers do not point exactly to zero when the stock is exactly horizontal, the screws 7 may be loosened and the thimbles 4, and with them the disks 8 on which are the dials, may be turned angularly to bring the zero markings directly under the pointers, thus correcting inaccuracies that may have obtained.

The invention having been described what is claimed as new and useful is:

A tool of the kind described comprising a stock formed with a transverse bore, thimbles disposed on both sides of the stock and entering the bore, each thimble being formed with a peripheral flange lying against the outer face of the stock and having ears at diametrically opposite sides of the flange, fasteners passing through the ears and securing the thimbles to the stock, disks set in the thimbles and lying in substantially the same planes as the flanges, each disk having its outer face provided with a dial, a shaft rotatably mounted in and carried between the two disks and provided with a gravity actuated element playing between the two thimbles, pointers carried by the shaft and playing over the dials on the disks, the thimbles being formed with externally threaded annular flanges in surrounding relation to the disks, glass covers lying against the outer edges of the annular flanges, and internally threaded bezels engaging the annular flanges and securing the glass covers in place.

In testimony whereof I affix my signature.

JOHN EMIL LILLBERG.